United States Patent [19]

Scheier et al.

[11] 4,175,302
[45] Nov. 27, 1979

[54] SEALED FEATHER PICKING UNIT

[75] Inventors: Donald J. Scheier; David R. Crawford, both of Kansas City, Mo.; David M. McDonald, Kansas City, Kans.

[73] Assignee: Simon-Johnson, Inc., Kansas City, Mo.

[21] Appl. No.: 929,121

[22] Filed: Jul. 28, 1978

[51] Int. Cl.² .............................. A22C 21/02
[52] U.S. Cl. ................................. 17/11.1 R
[58] Field of Search .................... 17/11.1 R

[56] References Cited

U.S. PATENT DOCUMENTS 3,551,942  1/1971  Crane ........................... 17/11.1 R

FOREIGN PATENT DOCUMENTS 1226317  3/1971  United Kingdom ................. 17/11.1 R Primary Examiner—Willie G. Abercrombie
Attorney, Agent, or Firm—Schmidt, Johnson, Hovey & Williams

[57] ABSTRACT

A rotary picking unit has its drive shaft journaled by bearings that must be sealed against exposure to moisture and the escape of lubricant. A housing which contains the bearings is fitted at its open end with an annular seal that is disposed outwardly adjacent the bearings in surrounding, sealing relationship with the shaft which projects outwardly from the housing and carries feather picking means at its outer end. A close fitting sleeve, preferably of a synthetic resinous material, surrounds that portion of the shaft projecting outwardly from the seal and is held stationary during rotation of the shaft within the sleeve so as to keep feathers, grit and grime from working along the shaft and deteriorating the interface between the shaft and the seal. The stationary sleeve bears against the backside of a rotating disc of the picking means and has a beveled outer end so that only a thin, knife edge of the sleeve actually makes contact with the disc. This minimizes the risk of pinching fine feathers between the end of the sleeve and the disc and forcing them to work along the shaft as it rotates relative to the sleeve.

8 Claims, 3 Drawing Figures

1

SEALED FEATHER PICKING UNIT

TECHNICAL FIELD

This invention relates to automated equipment for removing the feathers from poultry and, more particularly, to a rotary-type picker having a drive shaft carried by bearings which must be sealed against exposure to moisture, grit, grime and other deleterious substances associated with poultry processing.

BACKGROUND ART

The spinning shafts associated with so-called rotary or "disc" pickers necessarily require bearing support. Leaving such bearings open and exposed to ambient conditions in a poultry processing plant, however, would result in extremely short life for the bearings as a result of corrosion setting in and the accumulation of foreign particles of dirt, grit, grime, feather particles and other trash substances associated with poultry processing. Hence, it has been accepted practice for several years to shield the bearings in various ways, e.g., locating the bearings within a housing from which the spinning shaft projects and sealing off the housing via a suitable annular seal of an appropriate resilient material that circumscribes the shaft.

Typical arrangements of this kind, however, have not been entirely successful due to the fact that small, fine feathers associated with poultry have an unusual tendency to work between the rotating shaft and the seal, and because such feathers are considerably abrasive in nature under these conditions, the seal is deteriorated sufficiently that access channels or paths will be carved by the feathers to the vulnerable bearings. Moisture, grit and grime and other particles can thereupon gain access to the bearings via the channels worn by the feathers, once again resulting in premature bearing failure.

SUMMARY OF THE INVENTION

Pursuant to the present invention, the shaft which projects from the annular seal that guards the bearing for the shaft is received by a close-fitting, stationary sleeve that extends from the feather-engaging means at the outer end of the shaft inwardly to a point closely adjacent the seal. The sleeve is held against rotation by a plate that is bolted across the open front of the housing, the plate having a bore into which the sleeve is press-fitted prior to assembly. The beveled outermost end of the sleeve bears against the backside of a rotating disc of the feather-engaging means with a thin, knife edge so as to minimize the surface area of the sleeve against the disc, thereby reducing the risk of trapping feathers between the end of the sleeve and the disc and allowing them to work along the shaft to the seal. Preferably, the sleeve is made of a synthetic resinous material so as to minimize wear between the sleeve and the shaft.

DETAILED DESCRIPTION

Figure 1:
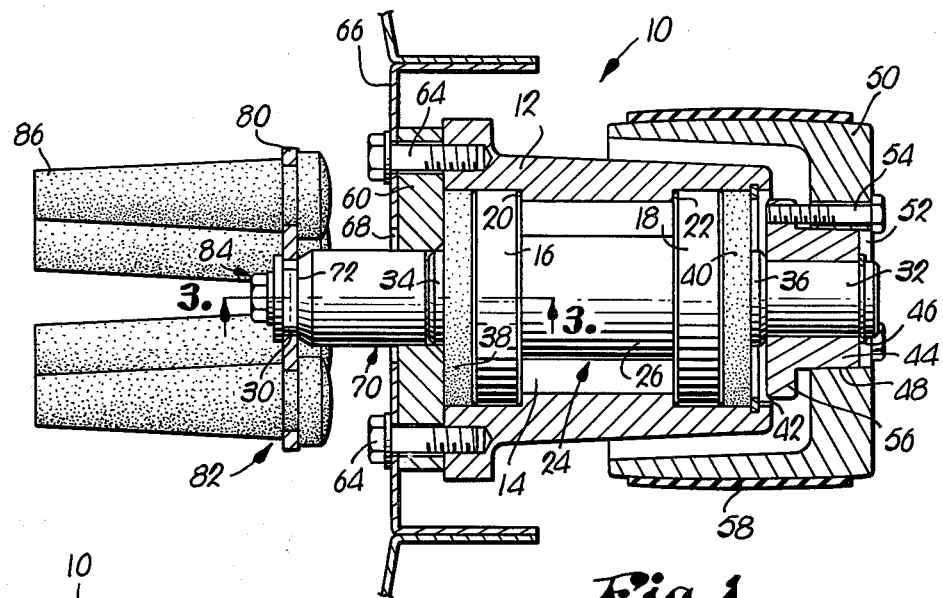
FIG. 1 is a longitudinal cross-sectional view of a rotary picking unit constructed in accordance with the principles of the present invention and attached to supporting structure adjacent the path of travel of poultry ready-to-be-picked.

The unit 10 includes a tubular housing 12 defining a through chamber 14 such that the housing 12 is open at its two opposite ends. A pair of bearings 16 and 18 adjacent said opposite ends, but set inwardly a short distance therefrom against respective annular shoulders 20 and 22, are coaxially aligned with one another on the longitudinal axis of the housing 12. Bearings 16 and 18 journal a shaft 24 which projects outwardly beyond the housing 12 through the opposite open ends thereof, the shaft 24 having a central portion 26 of largest diameter relative to other portions of the shaft 24, a pair of stepped-down portions 28 on opposite ends of the central portion 26 and about which the bearings 16 and 18 are disposed, and a pair of opposite end portions 30 and 32 of least diameter compared to the other portions of the shaft 24. A pair a collars 34 and 36 circumscribe the two opposite end portions 30 and 32 in abutting relationship to the stepped-down portions 28, and the collars 34,36 are fixed to the shaft 24 such as by a press fit relationship so that the collars 34,36 rotate with the shaft 24 and effectively define enlarged portions of the latter relative to the remaining, smaller diameter end portions 30 and 32.

A pair of annular seals 38 and 40 circumscribe respective ones of the collars 34 and 36 and are disposed outwardly adjacent the corresponding bearings 16 and 18. Seals 38 and 40 remain stationary during rotation of the shaft 24 and have their inner annular surfaces disposed in sealing relationship to the collars 34 and 36, while their outer, peripheral surfaces are disposed in sealing relationship to surrounding portions of the housing 12. Thus, the seals 38 and 40 close off the internal chamber 14 to ambient conditions. In the case of the "rear" seal 40, a snap ring 42 locks into an annular channel in the housing 12 so as to retain the seal 40 against the bearing 18. A bushing 44 is keyed onto the outer portion 32 of the shaft 24 for rotation with the latter, and a small snap ring 46 adjacent the outermost terminus of the end portion 32 holds the bushing 44 against outward axial movement along the portion 32. The periphery 48 of the bushing 44 is slightly tapered so as to be of least diameter adjacent the snap ring 46 and to progressively enlarge as the latter is departed. Hence, a pulley 50 provided with a similarly tapered bore 52 slips onto the bushing 44 and is wedged into place on the latter. A series of screws 54 passing through the pulley 50 and threaded into an inwardly disposed head 56 of the bushing 44 help retain the pulley 50 in place, and a belt 58 looped around the pulley 50 may provide a source of driving power for the shaft 24.

In the case of the "front" seal 38, a circular plate 60 having a centrally disposed bore 62 holds the seal 38 in place as a result of the fact that the plate 60 is secured to the housing 12 across the open front end of the latter by bolts 64. The bolts 64, in addition to being used to secure the plate 60 to the housing 12, also serve the purpose of fastening the entire unit 10 to support structure 66 associated with the picking machine of which the unit 10 is a part. The planar support structure 66 is provided with an opening 68 in axial registration with the bore 62 and is of such a diameter as to more than adequately clear the protruding portion 30 of the shaft 24.

With the plate 60 abutted against the front end of the housing 12 and likewise against the front seal 38, the collar 34 projects part way into the bore 62 and, of course, is rotatable within such bore 62 upon rotation of the shaft 24. A close-fitting sleeve 70, preferably of a suitable synthetic resinous material, is also received within the bore 62 so that the rear-most end of the sleeve 70 is spaced slightly from the front end of the collar 34. However, unlike the collar 34, the sleeve 70 is held by the plate 60 against rotation with the shaft 24, such fixed relationship between the sleeve 70 and the plate 60 being accomplished in any number of suitable ways. As one example, the sleeve 70 may simply be press fit into the bore 62 and, if desired, the bore 62 may be ribbed or knurled slightly so as to increase the frictional gripping relationship between the plate 60 and the sleeve 70.

Figure 2:
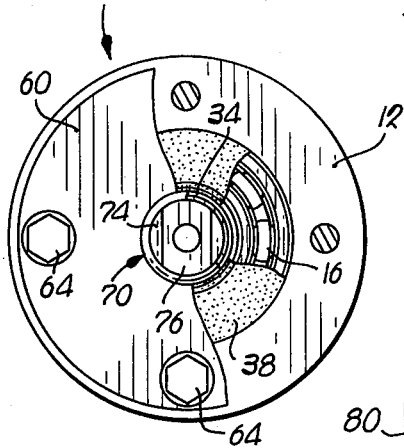
FIG. 2 is an outer end elevational view of the unit with the feather-engaging means removed and portions of the unit broken away to reveal details of construction.
Figure 3:
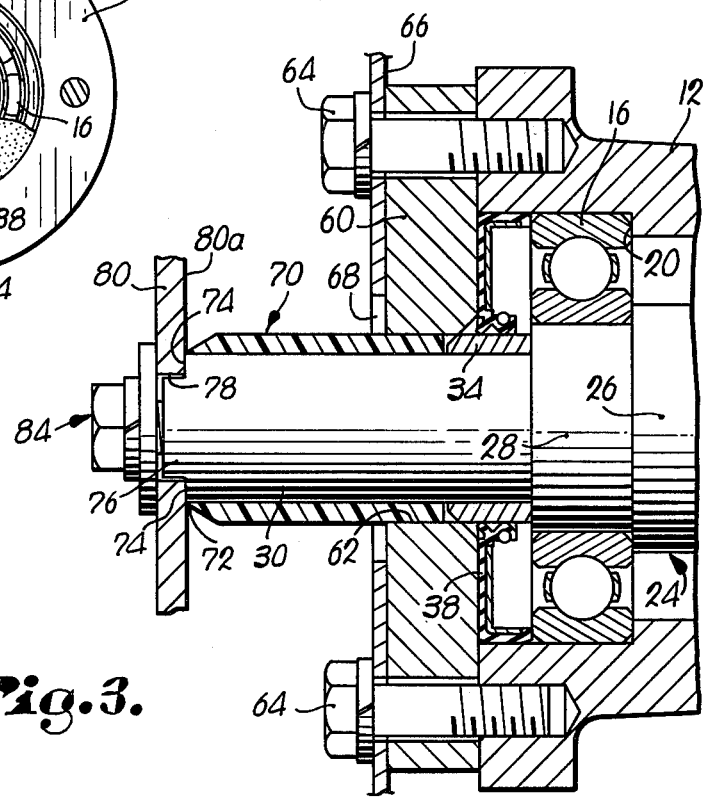
FIG. 3 is an enlarged, fragmentary cross-sectional view of the unit and supporting structure taken substantially along line 3—3 of FIG. 1.

Sleeve 70 projects substantially outwardly beyond the plate 60 through the opening 68 to a point adjacent the outermost end of the shaft 24, at which location the sleeve 70 is beveled so as to produce an outermost knife edge 72 of annular configuration. Such knife edge 72 is substantially flush with a pair of diametrically opposed shoulders 74 on the outer transverse face of the shaft 24 and located on opposite sides of a locating boss 76 of generally rectangular configuration as shown in FIG. 2. The locating boss 76 slips into a complimentally shaped, centrally disposed hole 78 in a disc 80 that forms part of what may broadly be referred to as feather-engaging means 82.

The feather-engaging means 82 also includes a fastener assembly 84 that clamps the disc 80 in place on the outer end of the shaft 24 against the two shoulders 74, such assembly 84 being removable so as to permit detachment of the disc 80 when necessary or desirable. The disc 80 is perforated at a number of circumferentially spaced locations so as to permit the insertion and retension of rubber fingers 86 forming still another part of the feather-engaging means 82. It is important to note that by virtue of the fact that the knife edge 72 of the sleeve 70 is substantially flush with the shoulders 74, the inwardly disposed surface 80a of the disc 80 bears against the knife edge 72 upon rotation of the disc 80.

Operation

When driving power is supplied to the belt 58, the pulley 50 is rotated to, in turn, rotate the shaft 24 within the bearings 16-18, thereby spinning the rubber picking fingers 86. As is well known in the art, if a properly prepared bird is then brought into contact with the fingers 86, the latter will quite effectively remove the contacted feathers from the bird.

The sleeve 70 remains stationary during rotation of the fingers 86, and thus fine feathers, grit and grime are kept away from the shaft 24 during the operation. Inasmuch as the knife edge 72 of the sleeve 70 is preferably in direct physical engagement with the backside 80a of the disc 80, the shaft 24 is simply not exposed to the deleterious materials. Hence, there is no opportunity for the materials to work along the outer portion 30 of the shaft 24 and to the seal 38. Therefore, the integrity of the sealing relationship at the interface of the seal 38 and the collar 34 is maintained, to the end that the bearings 16 and 18 are spared from premature failure due to the entry of moisture and foreign materials. Moreover, grease associated with the bearings 16 and 18 is maintained within the chamber 14 because of the continued integrity of the sealing relationship between the seal 38, the collar 34, and the housing 12.

Of additional importance is the fact that while the sleeve 70 does contact the disc 80 and therefore presents a pair of relatively moving surfaces that might tend to capture feathers and other foreign materials, the actual surface area in contact is quite small in view of the thin knife edge 72 which makes the contact with the disc 80. Thus, potential areas for trapping feathers and foreign particles are minimized, to the end that bearing life is extended.

Furthermore, it has been found that the close fit of the sleeve 70 around the shaft 30 has the effect of grinding up any feathers that might accidently slip into the sleeve 70 around the edge 72. By pulverizing such feathers so completely, they are reduced to harmless particles having little or no deleterious effect on the seal 38. In practice a clearance of 0.005 inches has been found to be effective.

We claim:

1. A rotary feather picking unit including:
an open-ended housing;
bearings within said housing;
a shaft supported by said bearings for rotation about the longitudinal axis of the shaft and projecting outwardly through and beyond the open end of the housing;
feather-engaging means secured to said shaft at the outer end of the latter for rotation therewith;
an annular seal outwardly adjacent said bearings and circumscribing said shaft in sealing relationship with the latter and with the housing so as to close said open end of the housing;
a close-fitting sleeve surrounding said shaft from said feather-engaging means inwardly toward said seal; and
means for holding said sleeve stationary with the seal and the housing during rotation of the shaft.

2. A rotary feather-picking unit as claimed in claim 1, wherein said shaft is provided with means defining a diametrically enlarged portion thereof with respect to the remaining portion of said shaft that extends outwardly to said outer end of the shaft, said seal receiving said diametrically enlarged portion and said sleeve receiving said remaining portion.

3. A rotary feather-picking unit as claimed in claim 2, wherein said means for holding the sleeve stationary includes a plate secured to said housing across said open end thereof, said plate having a bore therethrough receiving said sleeve and holding the same against rotation.

4. A rotary feather-picking unit as claimed in claim 3, wherein said sleeve has an inner end located within said bore adjacent to said enlarged portion.

5. A rotary feather-picking unit as claimed in claim 2, wherein said means defining an enlarged portion comprises a collar secured to said shaft for rotation therewith.

6. A rotary feather-picking unit as claimed in claim 1, wherein said sleeve has a beveled outermost end presenting an annular knife edge adjacent said feather-engaging means.

7. A rotary feather-picking unit as claimed in claim 1, wherein said feather-engaging means includes a member rotating in a plane perpendicular to the axis of rotation of the shaft, said sleeve having an outermost, annular end bearing against said member.

8. A rotary feather-picking unit as claimed in claim 7, wherein said outermost end of the sleeve is beveled to present an annular knife edge that bears against said member.

* * * * *